United States Patent [19]
Kikuchi et al.

[11] Patent Number: 6,142,680
[45] Date of Patent: Nov. 7, 2000

[54] OPTICAL TRANSMISSION/RECEPTION MODULE

[75] Inventors: Kimihiro Kikuchi; Yoshihiro Someno; Atsunori Hattori; Shoichi Kyoya, all of Miyagi-ken, Japan

[73] Assignee: Alps Electric Co., Ltd., Tokyo, Japan

[21] Appl. No.: 09/112,087

[22] Filed: Jul. 9, 1998

[30] Foreign Application Priority Data

Jul. 9, 1997  [JP]  Japan .................................. 9-183810

[51] Int. Cl.⁷ ....................................................... G02B 6/36
[52] U.S. Cl. ................................................ 385/93; 385/47
[58] Field of Search ................................. 385/31, 33, 39, 385/42, 47, 88, 92–94

[56] References Cited

U.S. PATENT DOCUMENTS

| | | | |
|---|---|---|---|
| 4,701,010 | 10/1987 | Roberts ........................... | 385/31 |
| 5,408,559 | 4/1995 | Takahasi et al. ................. | 385/89 |
| 5,463,707 | 10/1995 | Nakata et al. ................... | 385/35 |
| 5,796,899 | 8/1998 | Butrie et al. .................... | 385/92 |

FOREIGN PATENT DOCUMENTS

| | | |
|---|---|---|
| 250 331 A1 | 6/1987 | European Pat. Off. . |
| 0 250 331 | 12/1987 | European Pat. Off. . |
| 279 932 A1 | 12/1987 | European Pat. Off. . |
| 0 279 932 | 8/1988 | European Pat. Off. . |
| 706 069 A1 | 4/1996 | European Pat. Off. . |
| 3520269 A1 | 12/1986 | Germany . |
| 2162 355 | 1/1986 | United Kingdom . |

*Primary Examiner*—John D. Lee
*Assistant Examiner*—Michelle R. Connelly-Cushura
*Attorney, Agent, or Firm*—Brinks Hofer Gilson & Lione

[57] ABSTRACT

An optical transmission/reception module in which an LD, a lens holder, which supports a lens, a partial wave filter, a lens holder, which supports a lens, and an optical fiber are all mounted to a housing block, coaxially along a first axis. A reflecting mirror, a lens holder, which supports a lens, and a PD are also mounted to the housing block, coaxially along a second axis which is parallel to the first axis. Cutouts are formed in the housing block for providing large openings forwardly of and perpendicular to a mounting surface for mounting the partial wave filter thereon and a mounting surface for mounting the reflecting mirror thereon. In such an optical transmission/reception module, it is possible to maintain the precision with which a partial wave filter, which passes a transmission light therethrough, and a reflecting member, which reflects a reception light, are mounted to a desired mounting angle at a high level, and to reduce assembly costs.

13 Claims, 3 Drawing Sheets

OPTICAL TRANSMISSION/RECEPTION MODULE

BACKGROUND OF THE INVENTION

1. Field of the Invention

The present invention relates to an optical transmission/reception module for coupling a light-emitting element and a light-receiving element with respect to an optical fiber for passing therethrough transmission light and reception light of a plurality of different wavelengths.

2. Description of the Related Art

FIG. 6 is a cross sectional view of a conventional optical transmission/reception module. As shown in FIG. 6, the housing of the optical transmission/reception module roughly comprises four blocks. They are a center block 1, a LD (laser diode) block 2, a PD (photodiode) block 3, and a fiber block 4. A partial wave filter 5 is mounted in the center block 1. A laser diode 6 (D6), being a light-emitting element, and a lens holder 8, supporting a lens 7, are mounted to the LD block 2. A photodetector 9 (PD9), being a light-receiving element, and a lens holder 11, supporting a lens 10, are mounted to the PD block 3. An optical fiber 12 and a lens holder 14, supporting a lens 13, are mounted to the fiber block 4.

A transmission light of wavelength $\lambda 1$ from the LD 6, which has been transformed into parallel light beams by a lens 7 at the LD block side, passes through the partial wave filter 5 at the center block 1. Then, the parallel transmission light beams are gathered by the lens 13 in the fiber block 4, and passes through the optical fiber 12 from an end surface thereof in order to be transmitted. On the other hand, a reception light of wavelength $\lambda 2$, which has been scattered at an end surface of the optical fiber 12, is transformed into parallel light beams by the lens 13 at the fiber block 4. Then, the parallel reception light beams are reflected by the partial wave filter 5 in the center block 1, and gathered by the lens 10 at the PD block 3 in order to be received by the PD 9.

In assembling an optical transmission/reception module having such a structure, the LD block 2 and the fiber block 4 are affixed to the center block 1 by laser welding or the like, with their optical axes aligned, whereby optical axes alignments for the transmission light are performed. Thereafter, the center block 1 and the PD block 3 are affixed together by laser welding or the like, with their optical axes aligned, whereby optical axes alignments for the reception light are performed.

In the above-described conventional optical transmission/reception module, however, the partial wave filter 5 is disposed obliquely at a predetermined mounting angle of, for example, 45 degrees in the center of a space in the center block 1. Therefore, even in cases where the partial wave filter 5 is mounted to the center block 1 either directly or through a transparent supporting member, it is difficult to form a mounting reference surface for the partial wave filter 5 in the center block 1 with high precision, causing the partial filter 5 to be mounted less precisely at the desired mounting angle.

In addition, the optical axes alignments for four blocks 1 to 4 must be made, so that optical axes alignments cannot be made with high precision. Further, the four blocks 1 to 4, which are small in size, must be integrally welded together or the like, resulting in higher assembly costs.

SUMMARY OF THE INVENTION

Accordingly, it is an object of the present invention to provide a structure in which the light-transmission optical members, that is the light-emitting element, the optical fiber, and the other light-transmission optical members disposed therebetween including the partial filter, are accommodated in one housing block, coaxially along a first axis. The light-receiving optical members, that is the partial wave filter, the light-receiving element, and the other light-receiving optical elements disposed therebetween, are accommodated in the same housing block, coaxially along a second axis which differs from the first axis. The housing block has at least one cutout which provides an opening forwardly of and perpendicular to the mounting surface for mounting the partial wave filter thereon. With such a structure, it is possible to more precisely mount the optical fiber, the light-emitting element, and the light-receiving element to their corresponding blocks, to reduce assembly costs, and easily and more precisely form the mounting surface for mounting the partial wave filter thereon in the housing block, allowing the partial wave filter to be more precisely mounted at the predetermined mounting angle.

To this end, according to the present invention, there is provided an optical transmission/reception module comprising a light-emitting element from where a transmission light leaves; a first lens holder for supporting a first lens which collimates the transmission light which has left the light-emitting element; a partial wave filter for passing therethrough the transmission light collimated by the first lens; and a second lens holder for supporting a second lens which gathers the light, which has passed through the partial wave filter, at an end surface of an optical fiber; wherein all of the component members are accommodated in one housing block; wherein the optical transmission/reception module further comprises a third lens holder for supporting a third lens which gathers and concentrates a reception light, collimated by the second lens, after the reception light has left the end surface of the optical fiber, and reflected by the partial filter; and a light-receiving element for receiving the light gathered and concentrated by the third lens, in which the third lens holder and the light-receiving element are accommodated in the one housing block; and wherein a cutout is formed in the housing block so as to form an opening forwardly of and perpendicular to a mounting surface for mounting the partial wave filter thereon.

The module can be designed to allow the reception light, reflected by the partial wave filter, to be gathered by the third lens and received by the light-receiving element. However, when, in order to dispose the light-emitting element and the light-receiving element in a same plane at the housing block, the module is designed to allow the reception light, reflected by the partial filter, to be guided to the third lens through a reflecting member, the optical transmission/reception module can be easily mounted to a printed board. In such a case, when a cutout is formed in the housing block so as to provide an opening forwardly of and perpendicular to a mounting surface for mounting the reflecting member thereon, the mounting surface for mounting the reflecting member thereon can also be easily and very precisely formed at the housing block. Therefore, both the partial filter and the reflecting member can be more precisely mounted at their predetermined mounting angles. Although a reflecting mirror may be used for the reflecting member, a partial wave filter which reflects only reception light beams and transmits light beams of all other wavelengths may be used.

The housing block may be formed by cutting a metallic material, or by molding using a die-cast mold or the like.

DESCRIPTION OF THE PREFERRED EMBODIMENTS

Figure 1:
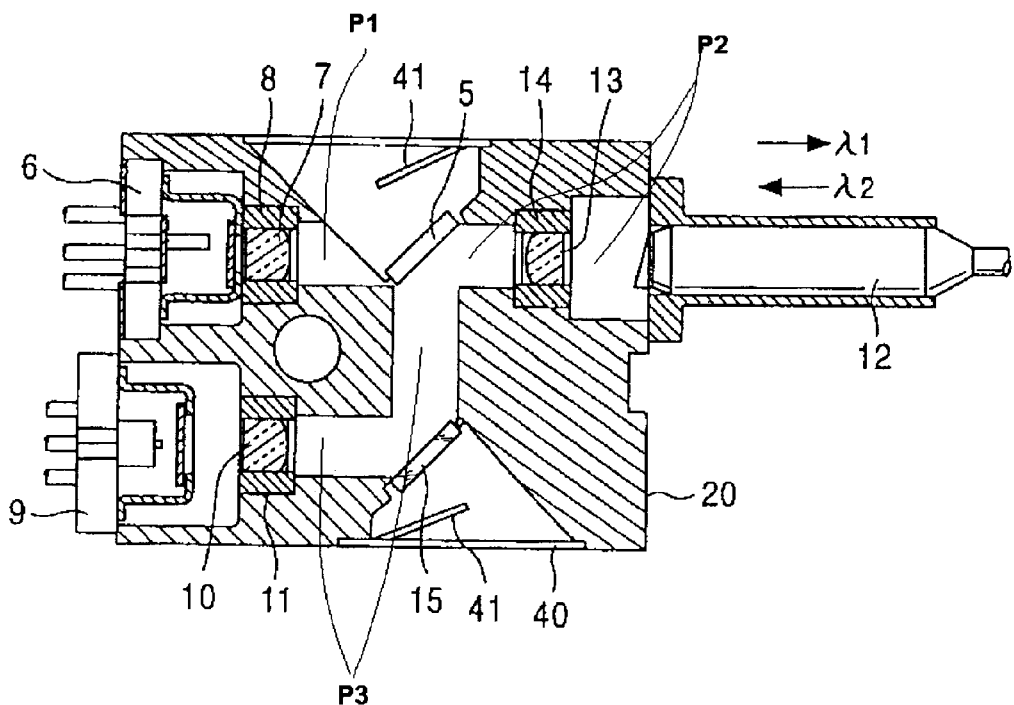
FIG. 1 is a cross sectional view of a first embodiment of the optical transmission/reception module in accordance with the present invention.
Figure 2:
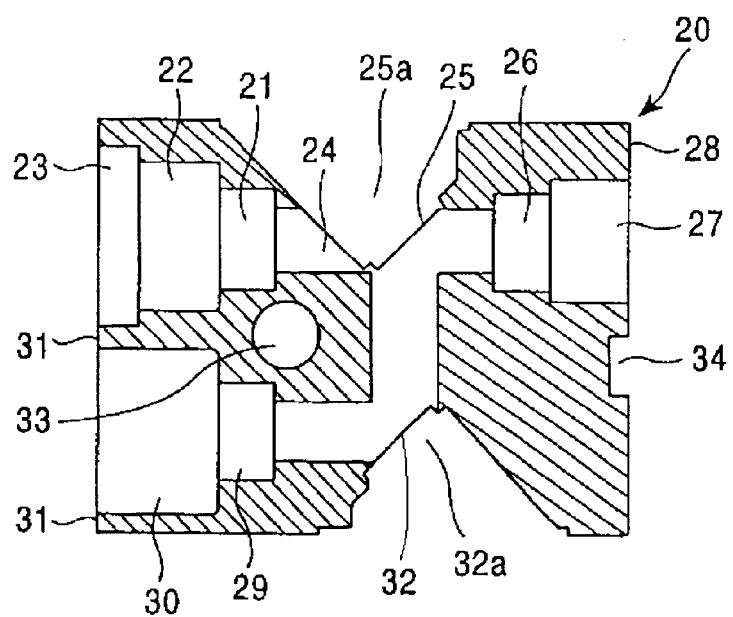
FIG. 2 is a cross sectional view of the housing block of the optical transmission/reception module.
Figure 3:
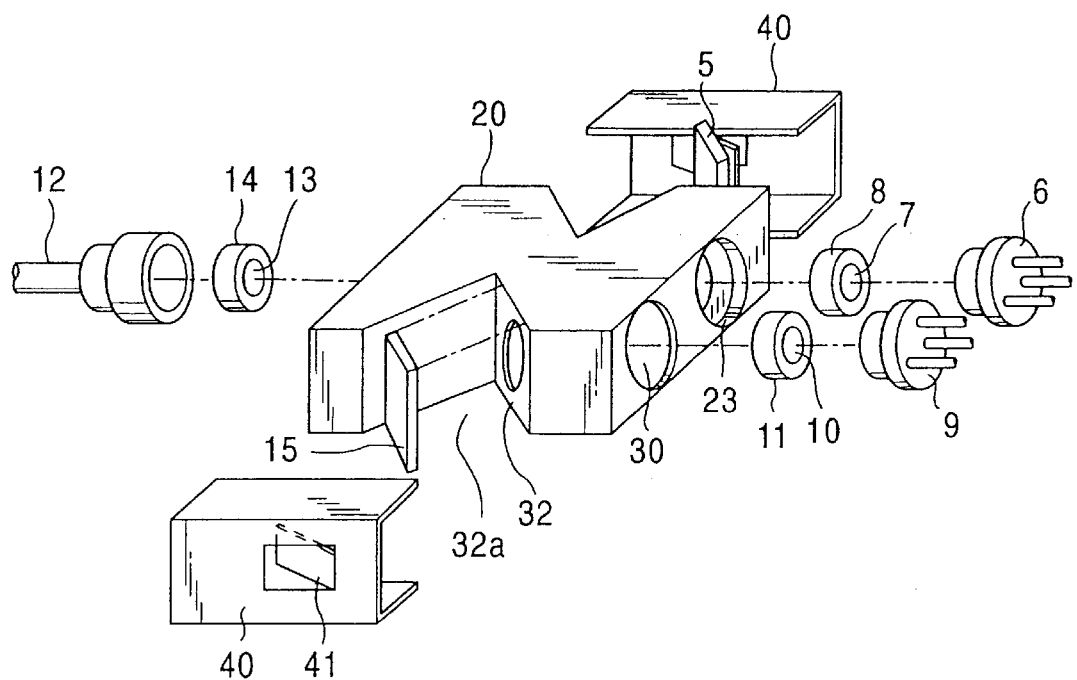
FIG. 3 is an exploded perspective view of the optical transmission/reception module.
Figure 4:
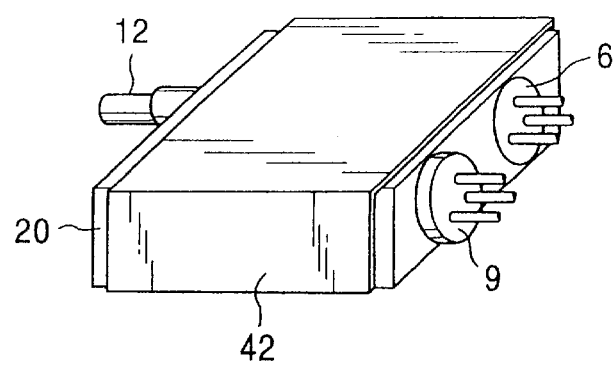
FIG. 4 is an appearance of the optical transmission/reception module.
Figure 6:
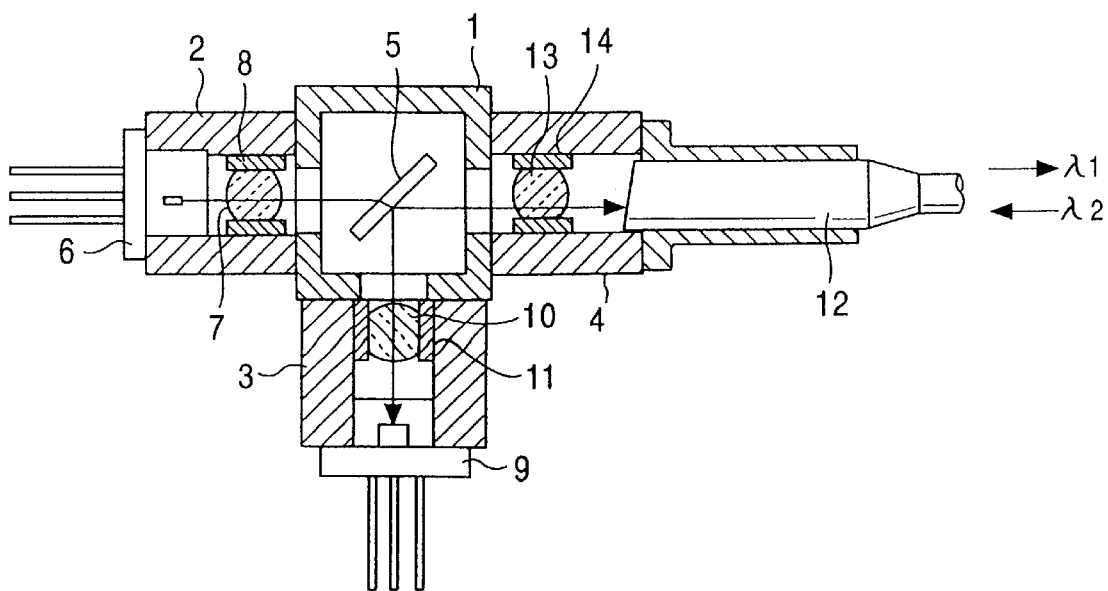
FIG. 6 is a cross sectional view of a conventional optical transmission/reception module.

A description will now be given of embodiments of the present invention with reference to the drawings. FIG. 1 is a cross sectional view of a first embodiment of the optical transmission/reception module in accordance with the present invention. FIG. 2 is a cross sectional view of the housing block of the optical transmission/reception module. FIG. 3 is an exploded perspective view of the optical transmission/reception module. FIG. 4 is an appearance of the optical transmission/reception module. Structural members corresponding to those of FIG. 6 are given the same reference numerals.

As shown in FIGS. 1 to 3, the optical transmission/reception module of the present embodiment includes one housing block to which component parts corresponding to those described in the conventional example are coaxially mounted, namely a LD 6, a lens holder 8, supporting a lens 7, a partial wave filter 5, a lens holder 14, supporting a lens 13 at a light transmission path side, and an optical fiber 12. In addition, a light-receiving reflecting mirror 15, a lens holder 11 supporting a lens 10, and a PD 9 are coaxially mounted to the housing block 20 so as to be disposed parallel to the optical axis with respect to which the component parts are coaxially mounted.

As shown in detail in FIG. 2, the housing block 20 has an opening 21 for disposing the lens holder 8 therein; an opening 22 for disposing the body portion of the LD 6 therein; an opening 23 for disposing the flange portion of the LD 6 therein; and an optical path opening 24. The openings 21, 22, 23, and 24 are continuously formed. The length of the opening 23 in the optical direction is set such that when the entire flange portion of the LD 6 is fitted into the opening 23 only the lead portion is exposed from a side surface 31 of the housing block 20. In addition, the housing block 20 has a mounting surface 25 for obliquely mounting thereon the partial wave filter 5 at an angle of 45 degrees from the optical axis, an opening 26 for disposing the lens holder 14 therein, and an optical path opening, 27, with the optical fiber 12 mounted to a side surface 28 of the housing block 20. The mounting surface 25, the opening 26, and the opening 27 are formed coaxially with the openings 21 to 23 at the light-emitting side. Further, the housing block 20 has an opening 29 for disposing the lens holder 11 therein, an opening 30 for disposing the body portion of the PD 9 therein, and a mounting surface 32 for obliquely mounting thereon the reflecting mirror 15 at an angle of 45 degrees from the optical axis. The openings 29 and 30 and the mounting surface 32 are formed parallel to the openings 21 to 23 at the light-emitting side of the housing block 20. The PD 9 is mounted so that the flange portion and the lead portion thereof are exposed from the side surface 31 of the housing block 20. Therefore, the LD 6 is mounted further inward into the housing block 20 than the PD 9 by an amount equal to the flange portion of the PD 9. The mounting surface 25 for mounting the partial wave filter 5 thereon and the mounting surface 32 for mounting the reflecting mirror 15 thereon each have a large opening formed forwardly thereof and perpendicular thereto by cutouts 25a and 32a, respectively. The housing block 20 has a screw hole 33 and an engaging groove 34, with the screw hole 33 being formed for receiving a screw (not shown) used to secure the optical transmission/reception module to, for example, a chassis or printed board of an electronic device, and the engaging groove 34 being formed for preventing rotation of the optical transmission/reception module when the optical transmission/reception module is being secured with a screw.

The housing block 20 with such a form is formed by cutting a metallic material, such as stainless steel. Since there are large openings formed forwardly of the mounting surfaces 25 and 32 by the large cutouts 25a and 32a, respectively, there is nothing which gets in the way of the cutting blade when it is being employed to form the mounting surfaces 25 and 32. As a result, the mounting surfaces 25 and 32 can be easily and very precisely formed. The housing block 20 may be formed by die-casting, instead of by cutting. In this case too, the molds, produced in correspondence with the mounting surfaces 25 and 32, respectively, are formed into simple shapes, thereby allowing the mounting surfaces 25 and 32 to be formed easily and very precisely.

The housing block 20 accommodates the LD 6, the lens holders 8, 11, 14 and respective lenses 7, 10, 13, the partial wave filter 5 and the PD 9. The housing block further comprises a first passage P1 to guide the transmission light collimated by the lens 7 to the partial wave filter 5. A second passage P2 guides the transmission light, which has passed through the partial wave filter, 5 to the end surface of the optical fiber 12 through the lens 13. The second passage P2 also guides the reception light, which has been emitted from the end surface of the optical fiber 12, to the partial wave filter 5 through the lens 13. A third passage P3 guides the reception light reflected by the partial wave filter 5 to the third lens 10.

In assembling the optical transmission/reception module having such a structure described above, the partial wave filter 5, the LD 6, the lens holder 8, and the lens holder 14 are secured to the housing block 20, along the optical path and at the light-emitting side thereof. Then, the optical axis of the optical fiber 12 is adjusted such that the transmission light (with wavelength λ1) from the LD 6 enters an end surface of the optical fiber 12 through the lens 7, the partial wave filter 5, and the lens 13, with the optical axis accurately set, after which the optical fiber 12 is affixed to the housing block 20 by welding or the like. Thereafter, the lens holder 11 and the reflecting mirror 15 are affixed to the housing block 20, along the optical axis and at the light-receiving side. Then, the optical axis of the PD 9 is adjusted such that the reception light (with a wavelength λ2) which has left the end surface of the optical fiber 12 enters the light-receiving surface of the PD 9 through the partial wave filter 5, the reflecting mirror 15, and the lens 10, with the optical axis accurately set, after which the PD 9 is affixed to the housing block 20 by welding or the like. Thereafter, c-shaped covers 40 are placed on the housing block 20 to prevent entry of dust into the cutouts 25a and 32a at the partial wave filter 5 side and at the reflecting mirror 15 side, respectively. A tongue 41 is formed in each cover 40 at an angle which prevents light reflected from the partial wave filter 5 to return back to its original path. Lastly, as shown in FIG. 4, a label is wound on the covers 40. The covers 40 are affixed to the housing block 20, and their holes, formed as a result of forming the tongues 41, are closed.

Although in the first embodiment the reflecting mirror 15 was used as the reflecting member for reflecting the reception light reflected by the partial wave filter 5, a partial wave filter capable of reflecting light with a wavelength of λ2 may also be used as the reflecting member.

In addition, although in the first embodiment the LD 6 and the PD 9 were disposed at the same side surface 31 of the housing block 20, the lens holder 11, supporting the lens 10, and the PD 9 may be disposed at a different side surface of the housing block 20 which is perpendicular to the side surface 31 of the housing block 20 (the lower end side in FIG. 1). In this case, the reflecting mirror 15 (reflecting member) is not used, so that a large opening is formed forwardly of the mounting surface 25, for mounting the partial filter 20 thereon, by forming the cutout 25*a*.

Figure 5:
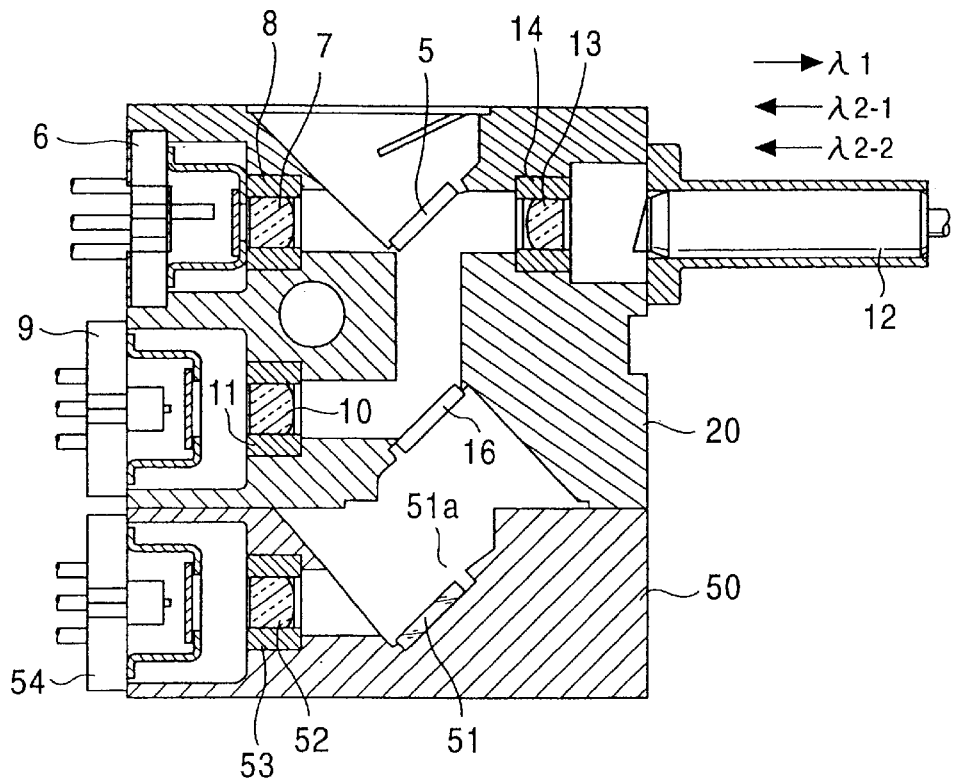
FIG. 5 is a cross sectional view of a second embodiment of the optical transmission/reception module in accordance with the present invention.

The second embodiment of the optical transmission/reception module shown in FIG. 5 differs from the first embodiment of the optical transmission/reception module in that in order to transmit a transmission signal of one wavelength (λ1) and receive reception signals of two different wavelengths (λ2-1 and, λ2-2), a partial wave filter 16 is used in place of the reflecting mirror 15, and a light-receiving unit 50 is used at the cutout 32*a* side as an additional component part. To the light-receiving unit 50 are mounted a reflecting mirror 51 for reflecting reception light of wavelength λ2-2 that has passed through the partial wave filter 16, a lens holder 53 supporting a lens 52, and a PD 54. The reflecting mirror 51, the lens holder 53, and the PD 54 are mounted parallel to the optical axes of the LD 6 and the PD 9. A cutout 51*a* is formed adjacent to the mounting surface side of the reflecting mirror 51. In this case too, since a large opening is formed forwardly of the reflecting mirror 51 mounting surface by the cutout 51*a*, the reflecting mirror 51 mounting surface can easily and very precisely be formed in the light-receiving unit 51, making it possible to mount the reflecting mirror 51 more precisely.

The optical transmission/reception module having the above-described structure transmits light in the same way that the optical transmission/reception module of the first embodiment does, but receives light in a different way. More specifically, the reception light beams having two different wavelengths λ2-1 and λ2-2, which have left an end surface of the optical fiber 12, are collimated by the lens 13 and then reflected by the partial wave filter 5 towards the partial wave filter 16 which reflects the reception light beam with wavelength λ2-1 and transmits the reception light beam with wavelength λ2-1. The reflected reception light beam with wavelength λ2-1 is gathered and concentrated by the lens 10 as in the first embodiment, and enters the light-receiving surface of the PD 9, whereas the transmitted reception light beam with wavelength λ2-2 is reflected by the reflecting mirror 51, gathered and concentrated by the lens 52 supported by the lens holder 53, and enters the light-receiving surface of the PD 54.

The light-receiving unit 50 is mounted to the housing block 20 and accommodates the lens 52 and lens holder 53 and the PD 54. The light-receiving unit 50 comprises a fourth passage P4 that guides light of wavelength λ2-2 that has passed through the second partial wave filter 16 to the lens 52. The fourth passage P4 is used in common by the housing block 20, i.e. the cutout 32*a* becomes a part of the fourth passage P4.

The present invention carried out in the above-described forms provides the following advantages.

According to the present invention, there are accommodated in one housing block, the light-emitting element from where a transmission light leaves, the first lens holder for supporting the first lens which collimates the transmission light that has left the light-emitting element, the partial wave filter for passing therethrough light collimated by the first lens, the second lens holder supporting the second lens which gathers and concentrates light, which has passed through the partial wave filter, at an end surface of the optical fiber. In addition, there are accommodated in the one housing block, the third lens holder and the light-receiving element, with the third lens holder supporting the third lens which gathers and concentrates reception light, collimated by the second lens after it has left the end surface of the optical fiber, and reflected by the partial wave filter, and with the light-receiving element receiving light gathered by the third lens. Formation, by a cutout, of a large opening forwardly of and perpendicular to the partial wave filter mounting surface allows all of the optical members to be accommodated in one housing block. Therefore, it is possible to mount the optical fiber, the light-emitting element, and the light-receiving element more precisely, to reduce assembly costs, and to allow the partial wave filter mounting surface to be formed easily and more precisely in the housing block, thereby allowing the partial wave filter to be more precisely mounted at the desired mounting angle.

In addition, according to the present invention, when a reflecting member for reflecting reception light is disposed in the optical path between the partial wave filter and the third lens, and a cutout is formed in the housing block such that an opening is formed forwardly of and in a direction perpendicular to the reflecting member mounting surface, the mounting surface of the reflecting member can also be formed easily and more precisely in the housing block. Therefore, both the partial wave filter and the reflecting member can be mounted more precisely at the desired mounting angles.

What is claimed is:

1. An optical transmission/reception module, comprising:
a light-emitting element to emit transmission light;
a first lens holder to support a first lens which collimates the transmission light which has left the light-emitting element;
a partial wave filter to pass therethrough the transmission light collimated by said first lens;
a second lens holder to support a second lens which gathers the light, which has passed through said partial wave filter, at an end surface of an optical fiber;
a third lens holder to support a third lens which gathers and concentrates reception light, collimated by said second lens, after the reception light has been emitted from the end surface of the optical fiber, and reflected by the partial wave filter;
a light-receiving element to receive the light gathered by said third lens; and
a housing block accommodating the light-emitting element, first lens holder and first lens, the partial wave filter, the second lens holder and second lens, the third lens holder and third lens, the light-receiving element;
the housing block further comprising:
a first passage to guide the transmission light collimated by the first lens to the partial wave filter;
a second passage to guide the transmission light which has passed through the partial wave filter to the end surface of the optical fiber through the second lens, and to guide the reception light which has been emitted from the end surface of the optical fiber to the partial wave filter through the second lens;
a third passage to guide the reception light reflected by the partial wave filter to the third lens;
a mounting surface, disposed between the first and second passages, to mount the partial wave filter thereon, and
a cutout formed from an outside surface of the housing block to the mounting surface and to a side thereof such that the partial wave filter is transportable from outside the housing block through the cutout and directly mountable on the mounting surface.

2. An optical transmission/reception module according to claim 1, further comprising a reflecting member to reflect the reception light reflected by said partial wave filter towards said third lens, the reflecting member being disposed at a bent portion of the third passage, the third passage being substantially L-shaped.

3. An optical transmission/reception module according to claim 2, wherein, in the housing block, a mounting surface to mount the reflecting member thereon is formed at the bent portion of the third passage, and a cutout is formed from the outside surface of the housing block to the mounting surface to mount the reflecting member thereon and to a side thereof such that the reflecting member is transportable from outside the housing block and directly mountable on the mounting surface to mount the reflecting member thereon.

4. An optical transmission/reception module according to claim 3, further comprising a cover, mounted to the housing block, to cover the cutout associated with the reflecting member.

5. An optical transmission/reception module according to claim 2, wherein the reflecting member is a reflecting mirror.

6. An optical transmission/reception module according to claim 1, further comprising a cover, mounted to the housing block, to cover the cutout.

7. An optical transmission/reception module according to claim 1, wherein the partial wave filter is plate-shaped.

8. An optical transmission/reception module, comprising:

a light-emitting element to emit transmission light;

a first lens holder to support a first lens which collimates the transmission light which has left the light-emitting element;

a first partial wave filter to pass therethrough the transmission light collimated by the first lens;

a second lens holder to support a second lens which gathers the light, which has passed through the first partial wave filter, at an end surface of an optical fiber;

a second partial wave filter to subject a first reception light beam and a second reception light beam having different wavelengths to a partial wave formation operation after the first and second reception light beams emitted from the end surface of the optical fiber have been collimated by the second lens and reflected by the first partial wave filter;

a third lens holder to support a third lens which gathers and concentrates the first reception light beam subjected to the partial wave formation operation by the second partial wave filter;

a first light-receiving element to receive the light gathered and concentrated by the third lens;

a first housing block accommodating the light-emitting element, first lens holder and first lens, the first and second partial wave filters, the second lens holder and second lens, the third lens holder and third lens, the first light-receiving element;

a fourth lens holder to support a fourth lens which gathers and concentrates the second reception light subjected to the partial wave formation operation by the second partial wave filter;

a second light-receiving element to receive the light gathered and concentrated by the fourth lens; and a second housing block mounted to the first housing block and accommodating the fourth lens and fourth lens holder and the second light-receiving element and comprising a fourth passage to guide the second reception light beam which has passed through the second partial wave filter to the fourth lens, with the fourth passage being used in common by the first housing block;

the first housing block further comprising:

a first passage to guide the transmission light collimated by the first lens to the first partial wave filter;

a second passage to guide the transmission light which has passed through the first partial wave filter to the end surface of the optical fiber through the second lens, and to guide the reception light which has been emitted from the end surface of the optical fiber to the first partial wave filter through the second lens;

a third passage to guide the first reception light beam reflected by the first partial wave filter to the third lens;

a first mounting surface, disposed between the first and second passages, to mount the first partial wave filter thereon;

a first cutout formed from an outside surface of the first housing block to the first mounting surface and to a side thereof such that the first partial wave filter is transportable from outside the first housing block through the first cutout and directly mountable on the first mounting surface;

a second mounting surface, disposed between the third and fourth passages, to mount the second partial wave filter thereon; and a second cutout formed from an outside surface of the first housing block to the second mounting surface and to a side thereof such that the second partial wave filter is transportable from outside the first housing block through the second cutout and directly mountable on the second mounting surface.

9. An optical transmission/reception module according to claim 8, further comprising a reflecting member to reflect the second reception light beam, which has passed through the second partial wave filter to the fourth lens, the reflecting member being disposed at a bent portion of the fourth passage, the fourth passage being substantially L-shaped.

10. An optical transmission/reception module according to claim 9, wherein the second housing block includes a third mounting surface to mount the reflecting member to the bent portion of the fourth passage and a cutout formed from an outside surface of the second housing block to the third mounting surface and to a side thereof so that the reflecting member is transportable from outside the second housing block and directly mountable to the third mounting surface.

11. An optical transmission/reception module according to claim 9, wherein the reflecting member is a reflecting mirror.

12. An optical reception/transmission module according to claim 8, further comprising a cover, mounted to the first housing block, to cover the first cutout used to transport the first partial wave filter.

13. An optical transmission/reception module according to claim 8, wherein the first and second partial wave filters are plate-shaped.

* * * * *